(12) United States Patent
Radinsky et al.

(10) Patent No.: US 10,346,413 B2
(45) Date of Patent: *Jul. 9, 2019

(54) TIME-AWARE RANKING ADAPTED TO A SEARCH ENGINE APPLICATION

(71) Applicant: Microsoft Technology Licensing, LLC, Redmond, WA (US)

(72) Inventors: Kira Radinsky, Zichron Yaakov (IL); Susan T. Dumais, Kirkland, WA (US); Krysta M. Svore, Seattle, WA (US); Jaime Brooks Teevan, Bellevue, WA (US); Eric Joel Horvitz, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,360

(22) Filed: Jan. 7, 2016

(65) Prior Publication Data

US 2016/0117333 A1    Apr. 28, 2016

Related U.S. Application Data

(63) Continuation of application No. 13/270,690, filed on Oct. 11, 2011, now Pat. No. 9,244,931.

(51) Int. Cl.
*G06N 5/04* (2006.01)
*G06F 16/17* (2019.01)
(Continued)

(52) U.S. Cl.
CPC ........ *G06F 16/24578* (2019.01); *G06F 16/17* (2019.01); *G06F 16/951* (2019.01);
(Continued)

(58) Field of Classification Search
CPC ......... G06F 17/30864; G06F 17/30867; G06F 17/3064; G06F 17/30554; G06F 17/30887; G06F 17/3053
See application file for complete search history.

(56) References Cited

U.S. PATENT DOCUMENTS 7,577,651 B2  8/2009  Jones et al.
7,647,314 B2  1/2010  Gordon et al.
(Continued)

OTHER PUBLICATIONS

Chapelle, et al., "A Dynamic Bayesian Network Click Model for Web Search Ranking," In Proc. of the 18th International Conference on World Wide Web, Apr. 20-24, 2009, Madrid, Spain, retrieved at <<http://www2009.org/proceedings/pdf/p1.pdf>>, pp. 1-10.
(Continued)

*Primary Examiner* — Angelica Ruiz
(74) *Attorney, Agent, or Firm* — Merchant & Gould (57) ABSTRACT

Techniques provide time-aware ranking, such as ranking of information, files or URL (uniform resource locator) links. For example, time-aware modeling assists in determining user intent of a query to a search engine. In response to the query, results are ranked in a time-aware manner to better match the user intent. The ranking may model query, URL and query-URL pair behavior over time to create time-aware query, URL and query-URL pair models, respectively. Such models may predict behavior of a query-URL pair, such as frequency and timing of clicks to the URL of the pair when the query of the pair is posed to the search engine. Results of a query may be ranked by predicted query-URL behavior. Once ranked, the results may be sent to the user in response to the query.

21 Claims, 7 Drawing Sheets

(51) Int. Cl.
*G06N 20/00* (2019.01)
*G06F 16/951* (2019.01)
*G06F 16/955* (2019.01)
*G06F 16/2457* (2019.01)

(52) U.S. Cl.
CPC ......... *G06F 16/9566* (2019.01); *G06N 5/045* (2013.01); *G06N 20/00* (2019.01)

(56) References Cited

U.S. PATENT DOCUMENTS

| | | | |
|---|---|---|---|
| 7,660,815 | B1 | 2/2010 | Scofield et al. |
| 7,685,099 | B2 | 3/2010 | Liu et al. |
| 7,685,192 | B1 | 3/2010 | Scofield et al. |
| 7,836,058 | B2 | 11/2010 | Chellapilla et al. |
| 7,970,934 | B1 | 6/2011 | Patel |
| 9,244,931 | B2 | 1/2016 | Radinsky |
| 2006/0074903 | A1* | 4/2006 | Meyerzon ......... G06F 17/30864 |
| 2007/0005646 | A1 | 1/2007 | Dumais et al. |
| 2007/0124307 | A1 | 5/2007 | Van Der Linden |
| 2007/0136234 | A1 | 6/2007 | Levin et al. |
| 2007/0192855 | A1* | 8/2007 | Hulten ............. G06F 17/30887 726/22 |
| 2007/0255689 | A1 | 11/2007 | Sun et al. |
| 2008/0177994 | A1* | 7/2008 | Mayer .................. G06F 9/4418 713/2 |
| 2008/0270376 | A1 | 10/2008 | Svore et al. |
| 2008/0313119 | A1 | 12/2008 | Leskovec et al. |
| 2009/0319367 | A1 | 12/2009 | Sullivan |
| 2010/0299350 | A1 | 11/2010 | Konig et al. |
| 2011/0029517 | A1 | 2/2011 | Ji et al. |
| 2011/0035397 | A1 | 2/2011 | Joshi et al. |
| 2011/0161260 | A1* | 6/2011 | Burges ............. G06F 17/30887 706/12 |
| 2011/0231380 | A1* | 9/2011 | Sadagopan ....... G06F 17/30864 707/706 |
| 2011/0258148 | A1* | 10/2011 | Gao .................. G06F 17/30867 706/12 |

OTHER PUBLICATIONS

Office Action for U.S. Appl. No. 13/270,690, dated Oct. 24, 2014, Radinsky et al., "Time-Aware Ranking Adapted to a Search Engine Application", 11 pages.

Office action for U.S. Appl. No. 13/270,690, dated May 12, 2015, Radinsky et al., "Time-Aware Ranking Adapted to a Search Engine Application", 14 pages.

U.S. Appl. No. 13/270,690, Amendment and Response filed Jan. 13, 2015, 17 pages.

U.S. Appl. No. 13/270,690, Amendment and Response filed Aug. 12, 2015, 14 pages.

U.S. Appl. No. 13/270,690, Notice of Allowance dated Sep. 14, 2015, 7 pages.

* cited by examiner

TIME-AWARE RANKING ADAPTED TO A SEARCH ENGINE APPLICATION

RELATED APPLICATIONS

This application claims priority to and is a continuation of U.S. patent application Ser. No. 13/270,690, filed on Oct. 11, 2011, the entire contents of which are incorporated herein by reference.

BACKGROUND

Because the Internet includes a vast amount of information, finding items of particular interest may involve use of a search engine. A user may enter a query, and receive a listing of URLs (uniform resource locators) in response. The search engine may prioritize the listing, such as by listing more popular URLs first and less popular URLs later. In some circumstances, the search engine may prioritize older content higher than newer content, because the older content may have more click data and a history of greater popularity.

In some circumstances, the search engine may provide a number of URLs that are unrelated to the intent of the user's query. Additionally or alternatively, the search engine may provide URLs in an incorrect order. These errors may occur because the query may have a number of possible meanings or interpretations, and the search engine is unable to discern the user's intent.

In other circumstances, the search engine may understand the general intent of the user, but it may be unable to put the intent within a time-aware context and identify URLs of interest to the user. For example, the user may be looking for "off-season travel deals," but without associating the query with a season, the search may be inefficient. This may cause inconvenience to the user, who may be forced to sort through URLs that include deals offered in prior seasons.

And in still other circumstances, the search engine may not react quickly enough, when determining a ranking of URLs to provide to users, to the changing preference of users across a large population. This may result in a listing of URLs that emphasizes URLs with fading popularity and fails to emphasize URLs that are growing in popularity.

SUMMARY

Systems and methods for time-aware ranking may be used in a search engine or other application. Such systems and methods may model search queries, URLs (uniform resource locators) and/or query-URL pairs to better understand intent of a user. In one example, results generated by a search engine are ranked in a time-aware manner. The ranking of the results may include modeling of query, URL and query-URL pair behavior over time. In one example, the modeling creates one or more of three types of models, including: temporal query behavior models (how users click/search for a query); temporal URL behavior models (how users click a URL over time); and/or temporal query-URL behavior models (how the user clicks on the URL for a specific query). Such models may be used to predict behavior of a query-URL pair, such as frequency and timing of clicks to the URL of the pair when the query of the pair is input to the search engine. Results of a query sent to a search engine may be ranked according to a model of predicted query-URL behavior to better conform the results to intent of the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

This document describes techniques for providing time-aware ranking of information. In one example, the time-aware ranking better appreciates a user's intent when providing a query to a search engine, and thereby provides a preferable ranking of URLs (uniform resource locators) for selection by the user. The ranking of results may include modeling of query behavior, URL behavior and/or query-URL pair behavior over time to create time-aware query, URL and query-URL pair models, respectively. Such models may be used to predict behavior of a query-URL pair, such as frequency and timing of clicks to the URL of the pair when the query of the pair is posed to the search engine. Results of a query to a search engine may be ranked according to the predicted query-URL behavior. Once ranked, the results may be sent to a client in response to the query.

The discussion herein includes several sections. Each section is intended to provide an example for purposes of illustration, and is not intended to be construed as allencompassing or limiting of the techniques discussed herein. More particularly, this entire description is intended to illustrate components which may be utilized in time-aware ranking, but not components which are necessarily required. The discussion begins with a section entitled "Time-Aware Ranking in a Search Engine Environment," which describes one environment that may implement the time-aware ranking techniques described herein. This section provides a high-level discussion of search engine architecture and time-aware URL ranking. Next, a section entitled "Time Series Modeling" illustrates and describes techniques that can be used to model queries, URLs and query-URL pairs. In one example, time series modeling techniques are described with respect to queries provided to a search engine, URLs clicked by users/clients after receipt from a search engine in response to a query, and the frequency and behavior of query-URL pairs over time. A further section, entitled "Model Selection Techniques" illustrates and describes techniques that may be used to select from between available models. In one example, rules-based analysis may be utilized to select between models based on aspects related just to queries, aspects related just to URLs, or on matches, features and/or aspects related to both a query and a URL. The model selected is not limited to any particular technology or configuration. A further section, entitled "Example URL Ranking" illustrates and describes techniques for implementing URL ranking, including aspects of a user interface. In a still further section, entitled "Example Processes" illustrates and describes techniques associated with time-aware modeling. Finally, the discussion ends with a brief conclusion.

This brief introduction, including section titles and corresponding summaries, is provided for the reader's convenience and is not intended to describe and/or limit the scope of the claims or any section of this disclosure.

Time-Aware Ranking in a Search Engine Environment

Figure 1:
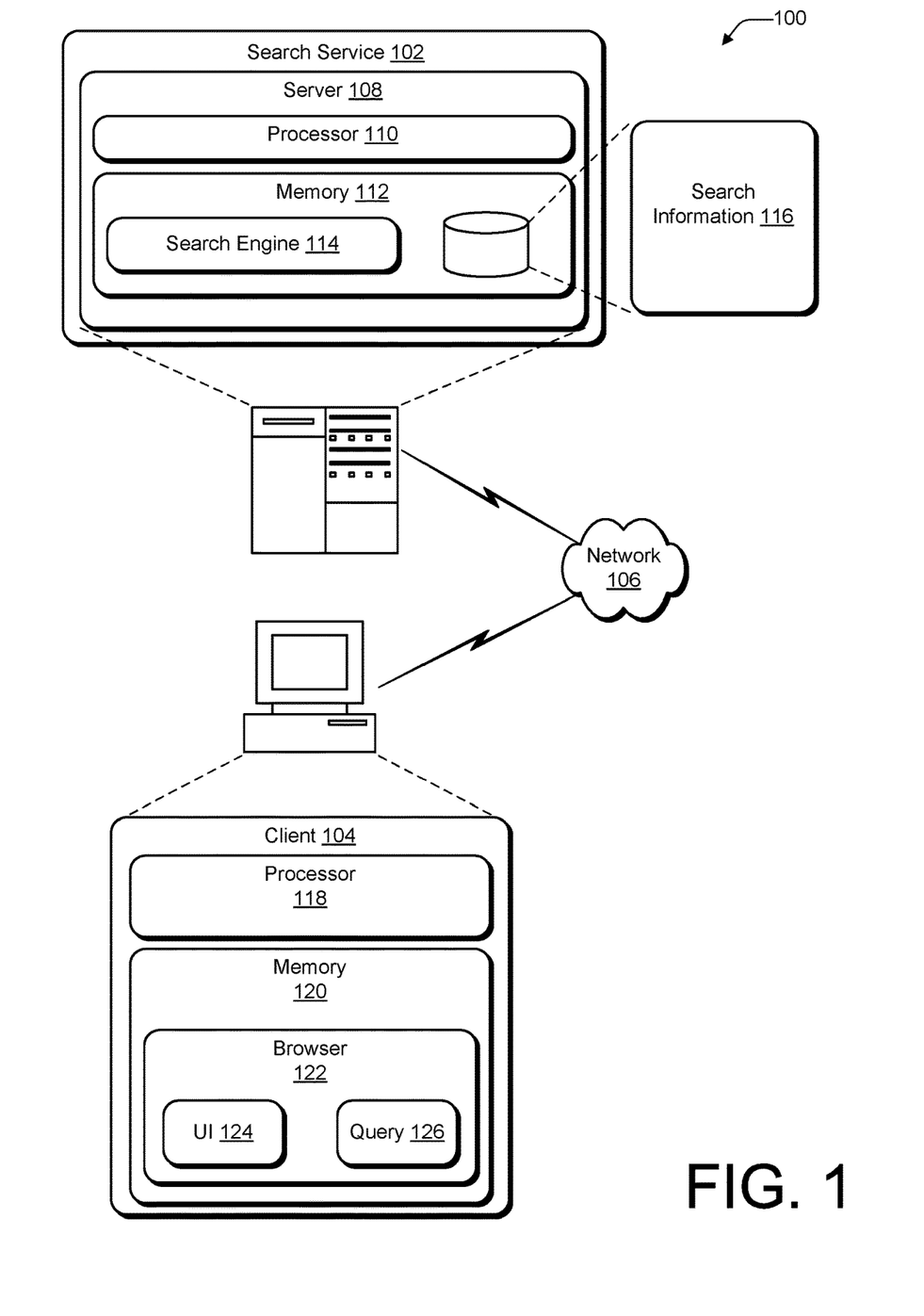
FIG. 1 is a diagram illustrating a system implementing an example of time-aware ranking.

FIG. 1 is a diagram illustrating a system 100 implementing an example of time-aware ranking. In an example operation, a client sends a query over a network to a search engine. The search engine considers appropriate URLs for inclusion in a response to the client. Additionally, the search engine may consult time-aware models of the query, the URL(s) and/or the query paired with each of the URLs. The time-aware models may provide better understanding of the intent of the user and/or what was meant by the query as submitted. Accordingly, the models of the query, URL and/or query-URL pair may be considered when ranking the URLs sent to the client in response to the query.

The system 100 implementing an example of time-aware ranking may include a search service 102 and a client 104, in communication over a network 106, such as the Internet, a LAN (local area network), WAN (wide area network), an intranet or other network. The search service 102 may include one or more servers 108. The server(s) may be organized singly or collectively, such as in a "server farm," or other appropriate work-sharing and/or load-sharing arrangement. Each server may include one or more processors 110 in communication with memory 112. The processor(s) 110 may be single "microprocessor(s)," mainframe processors or any type of parallel processor arrangements known or later created. Additionally, the processor(s) 110 may include associated processing hardware and/or firmware, such as memory management units (MMUs), "math" co-processors, application specific integrated circuits (ASICs) and/or other devices, as needed or envisioned.

A search engine 114 may be defined within memory 112 of one or more server 108. The search engine may access the World Wide Web (the Internet) to obtain search or search-related information 116. The information 116 may allow the search engine 114 to correlate a query sent by the client 104 with one or more URLs or documents that may be accessible to the client over the network 106.

The client 104 may include one or more processor(s) 118 in communication with one or more memory devices 120. The memory devices 120 may include one or more each of solid state memory devices, mechanical (disc and/or disc drive) memory devices, optical memory devices, etc. A browser 122, such as a commercial browser program, may be defined in memory and executed and/or operated by the processor 118. The browser may be configured with a user interface 124 to both receive one or more queries 126 and display results from the queries. The results may be obtained from the search engine 114, and may include listing(s) of URL(s) defined in the UI 124.

Figure 2:
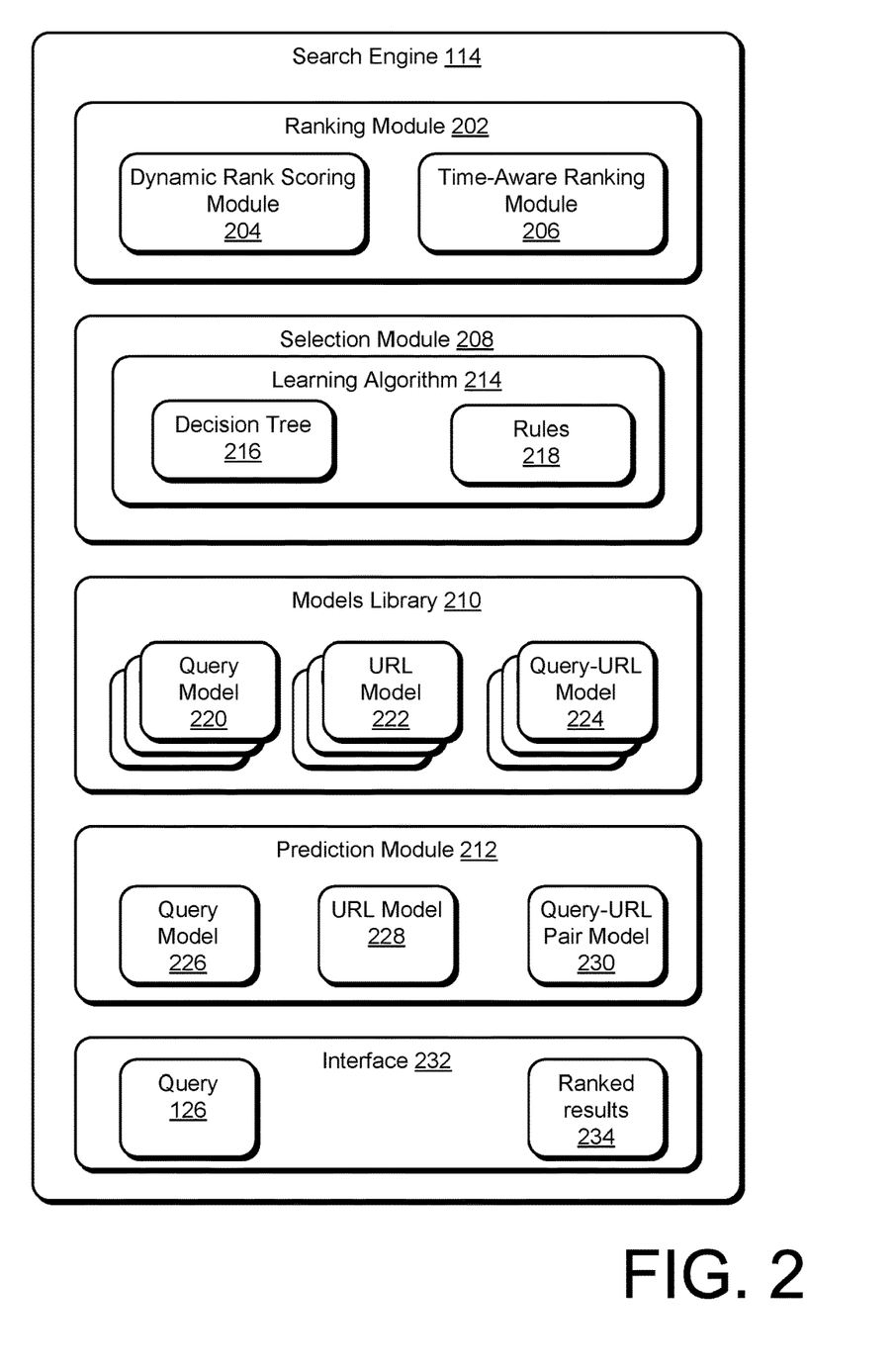
FIG. 2 is a diagram illustrating detail of a search engine implementing a time-aware ranking system.

FIG. 2 is a diagram illustrating example detail which may be included in the search engine 114 of the search service 102 seen in FIG. 1. The search engine 114 implements an example of a time-aware ranking system. In the example of FIG. 2, a ranking module 202 may be configured to access search information 116 (see FIG. 1) defined in memory and to determine one or more relevant URLs, links, documents, files or data associated with an incoming query (e.g., query 126, generated by client 104, as seen in FIG. 1). In one example, the ranking module 202 receives a query as input and generates a listing of URLs as output. The URLs may be ranked in a time-aware manner based on user intent and in accordance with expected relevance a user of the client 104 (see FIG. 1).

In the example of FIG. 2, the ranking module 202 may include a dynamic rank scoring module 204 and a time-aware ranking module 206. The dynamic rank scoring module 204 may be configured to rank and/or score URLs according to information obtained from memory (e.g., search information 116 of FIG. 1). The dynamic rank scoring module 204 may be considered dynamic in that it is adaptable to changes—e.g., the dynamic rank scoring module 204 may select, rank and/or score a website differently or "dynamically" with respect to a query. Such dynamics and/or change may be related to the availability of new websites, modifications to existing websites, and/or transformation in the popularity of websites due to demographics, fad, competition and other reasons. Accordingly, the dynamic rank scoring module 204 may receive input including a query and provide output including a ranked listing of URLs, links, documents, files or data. Such a listing may be calculated to emphasize more popular choices in the listing, such as by ranking them higher with the listing.

In the example of FIG. 2, the ranked listing of URLs output by the dynamic rank scoring module 204 may be refined and/or reordered by the time-aware ranking module 206. The time-aware ranking module 206 may be configured to model and/or predict a value and/or intent of a query, a URL and/or a query-URL pair to a user. The model and the predication may be based in part on time, such as time of day, time and/or season of a year, elapsed time since a website was launched, etc. The prediction may form a basis for estimation and/or model of a user's intent in making a query. For example, the time-aware ranking module 206 may ascribe a different intent to the query "U.S. Open," depending on the month of the year. In particular, a user's intent when formulating the query "U.S. Open" may be issues related to golf or to tennis, depending on the season. Additionally, a user's intent may be associated with tickets and background information before the event, and results and recap after the event. Thus, the time-aware ranking module 206 may function in cooperation and/or conjunction with the dynamic rank scoring module 204 to order URLs obtained by the search engine 114 in response to a query. In some example configurations, the time-aware ranking module 206 may be configured to include and/or interface with a selection module 208, a models library 210 and a prediction module 212. In such an implementation, the selection module 208 may be configured to select one or more models from the models library 210. The prediction module 212 may be configured to utilize the selected model and to predict a user's intent when submitting a query.

The selection module 208 may be configured to select from among models in the models library 210. The selected models may model, describe and/or predict query behavior, URL behavior and/or behavior of query-URL pairs. The selection module 208 may select from among two or more models in a manner appropriate for a particular implementation of the search engine 114. In the example of FIG. 2, the selection module 208 includes a learning algorithm 214. The learning algorithm 214 may be configured with any appropriate algorithm to select from among available models based on aspects related to just queries, aspects related just to URLs, or on matches, features and/or aspects related to both a query and a URL. In the example of FIG. 2, a learning algorithm 214 is adapted to use a decision tree 216 and associated rules 218. Over time, the decision tree 216 and rules 218 may be changed and/or adapted to fit changing circumstances. For example, the decision tree 216 may be retrained to include additional and/or different branches, and the rules 218, which may govern which branch on the decision tree is selected and under what circumstances, may be amended, enhanced, extended and/or changed. Accordingly, in the example of FIG. 2, the selection module 208 may include a learning algorithm 214. The learning algorithm may include any desired learning algorithm, technology or process. In one example, the learning algorithm may utilize a decision tree 216 and/or rules 218. In other example, other learning technology may be utilized.

The selection module 208 may select one or more models from the models library 210 or other repository of models, maintained either on site or remotely. The models library 210 may include one or more of a plurality of query models 220, a plurality of URL models 222 and a plurality of query-URL models 224. In one example, the models library 210 may periodically update one or more of the plurality of query models 220, the plurality of URL models 222 and/or the plurality of query-URL models 224. The update may be based on factors including, and/or models of, queries submitted to the search engine, URLs sent by the search engine and clicked by a client, user behavior and any other data, information and/or metadata, such as location, etc.

Figure 3:
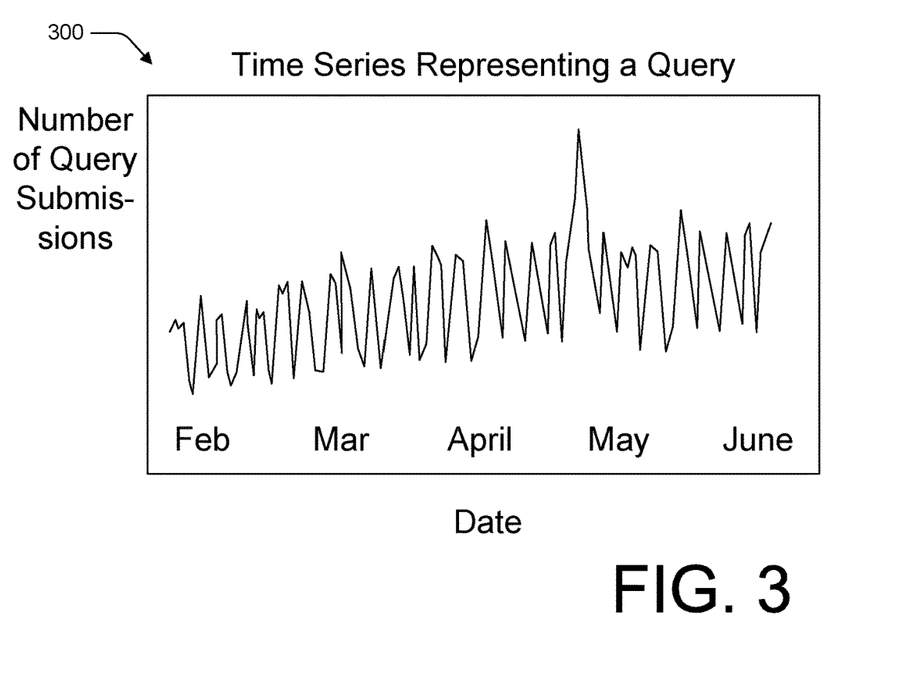
FIG. 3 is graph illustrating an example of a time series representing a query and frequency with which the query is submitted to a search engine.

Each of the plurality of query models 220 provides a model of query behavior. In one example, the model may provide information on the timing and frequency that the query is submitted to one or more search engines. Thus, each query (e.g., "football") may have a plurality of query models 220 that model that query. The models 220 may be based on different technologies, e.g., one or more models may be based on technology related to a time series. FIG. 3 shows an example of a time series representing a query.

Figure 4:
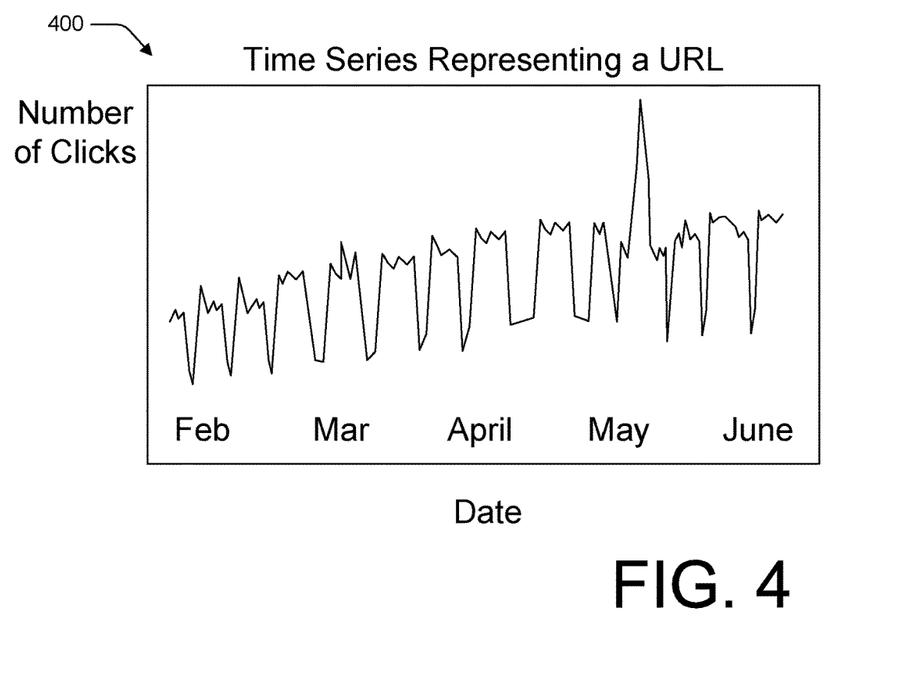
FIG. 4 is graph illustrating an example of a time series representing a URL and frequency with which the URL is both provided to a user in response to a query and also clicked by the user.

Each of the plurality of URL models 222 provides a model of URL behavior. In one example, the model may provide information on the timing and frequency that a URL, provided to one or more clients by one or more search engines, is clicked by one or more clients to whom the URL was provided in response to a query. (Note that within this document, "clicked" may also include copying and pasting the URL into an appropriate location in a browser to load data associated with the URL.) Thus, each URL (e.g., "BlueTeam.com") may have a plurality of URL models 222 that model the URL. The models 222 may be based on different technologies, e.g., one or more models may be based on technology related to a time series. FIG. 4 shows an example of a time series representing a URL.

Figure 5:
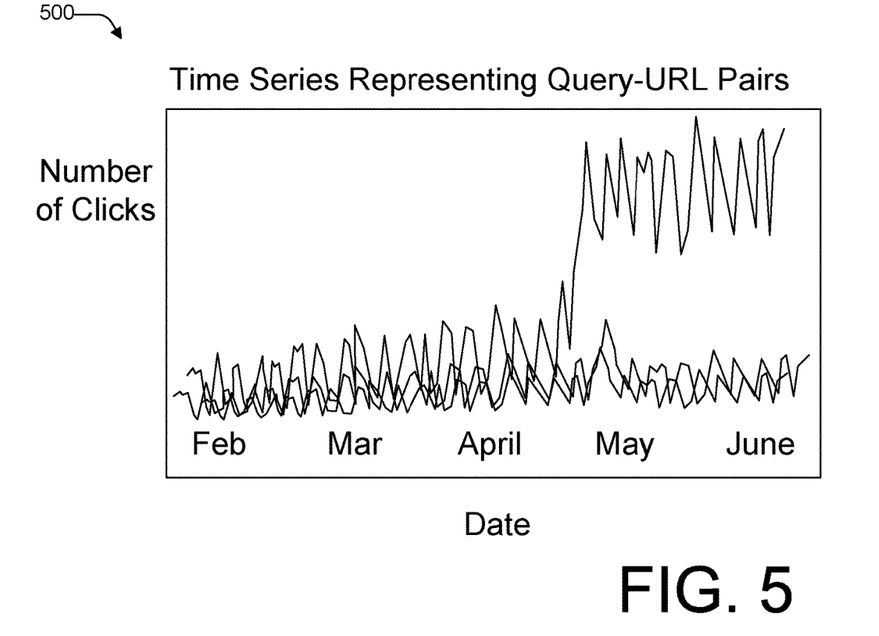
FIG. 5 is graph illustrating a plurality of example time series, each time series representing a query-URL pair. In the example of FIG. 5, one query-URL pair becomes particularly active in late April.

Each of the plurality of query-URL pair models 224 provides a model of behavior of a query-URL pair. A query-URL pair is a particular query (e.g., "football") paired a particular URL (e.g., "BlueTeam.com"). In one example, each query-URL pair can be modeled (such as by a time series) and may predict a value at an evaluation date. Such a value may be a probability density function indicating likelihood of receipt of the query by a search engine and/or a likelihood of a click on the URL by a client/user. Thus, the query-URL pair models 224 describe, predict and/or model behavior of a particular query paired with a particular URL. In one example, the model may provide information on the timing and frequency of the query-URL pair. In particular, the model may provide information on the query, provided to a search engine by a client/user, and information (e.g., click information) on the URL, provided by the search engine in response to the query. The models 224 may be based on different technologies, e.g., one or more models may be based on technology related to a time series. FIG. 5 shows an example of a time series representing a query-URL pair.

The prediction module 212 may be configured to assist the time-aware ranking module 206 of the ranking module 202 to predict intent of a user when submitting a query. In particular, the prediction module 212 may predict user intent based on input from, or interaction with, models 226-230 selected from among the query, URL and/or query-URL pair models 220-224. Thus, the prediction module 212 may utilize the model(s) 226-230 selected by the selection module 208 and to predict a user's intent when submitting a query. In one example, the prediction module 212 may utilize only the query module 226 and URL model 228 to determine user intent. In another example, the prediction module 212 may utilize only the query-URL model pair model 230 to determine user intent. In a still further example, the prediction module 212 may utilize one or more of the query module 226, the URL model 228 and the query-URL model pair model 230 to determine user intent.

An interface 232 may be configured to input and output information from the search engine 114 to the search service 102. In one example, queries 126 from clients 104 (FIG. 1) and ranked URL data or results 234 to be sent to clients pass through the interface 232.

Time Series Modeling

Time series are an example of one tool that is useful in predicting and/or determining relationship(s) involving queries, query frequency, URL clicks (clicking or otherwise following the link of a URL), query-URL behavior, etc. In particular, time series may be used in a modeling process, in which data gathered over time may be used to predict future actions. A time series may be a sequence of data points, typically measured at successive times and spaced at uniform intervals. One or more time series may be expressed for human inspection as a graph (e.g., FIGS. 3-5). A processor may utilize a time series in a different format, such as a function(s), equation(s), databases, etc.

FIG. 3 is graph 300 illustrating an example of a time series representing a query and frequency with which the query is submitted to a search engine. The number of queries (seen in the vertical axis) varies over time (seen in the horizontal axis).

FIG. 4 is graph 400 illustrating an example of a time series representing a URL and frequency with which the URL is provided to a user in response to a query and/or clicked by the user. The number of clicks on the URL (seen in the vertical axis) varies over time (seen in the horizontal axis). Note that "clicks" on the URL also includes copy and paste of the URL into a browser window.

FIG. 5 is graph 500 illustrating a plurality of example time series, each time series representing a query-URL pair. The vertical axis represents a number of clicks on the URL of each query-URL pair. In the example of FIG. 5, one query-URL pair becomes particularly active in late April.

Model Selection Techniques

As noted in FIG. 2, the selection module 208 selects models from the models library 210 for use in the prediction module 212. As such, the selection module 208 may be considered to be a model selection model, or a model that is configured to select model(s). For example, the selection module 208 may aid in selection between a plurality of query categories (e.g., a "celebrity query" or other category, as indicated by a classifier). Having selected a category, selection may be made from among the plurality of query models 220 to thereby select a query model 226 for use. Similarly, the selection module may select URL model 228 and query-URL model 230 from among those available in the models library 210.

As was also noted, the selection module 208 may be configured as a learning algorithm 214, which grows, adapts and "learns" to better select models based on events. In one example, the learning algorithm 214 is configured as a decision tree 216 and associated rules 218.

Figure 6:
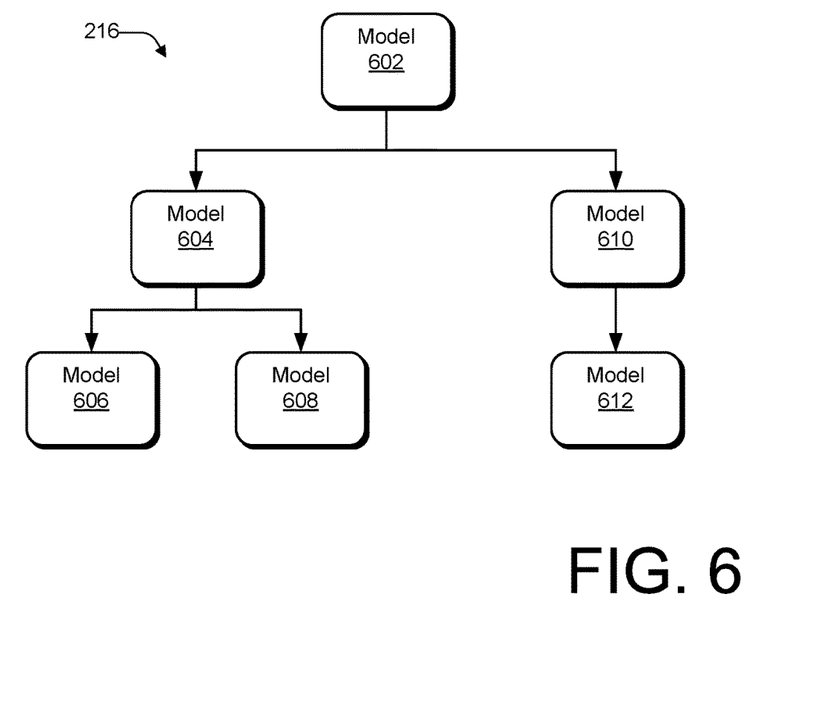
FIG. 6 is a diagram illustrating an example of a decision tree that may be rules-based and may be used to decide between a plurality of models, and thereby select desirable model of queries, URLs and/or query-URL pairs.

FIG. 6 is a diagram illustrating example detail of the decision tree 216, which is one example of how the selection module 208 may be configured. In one example, the decision tree 216 may be rules-based and may be used to decide or select between a plurality of models. The plurality of models may include model queries, URLs and/or query-URL pairs or others. Because the decision tree 216 is a learning algorithm, it may evolve and learn, and thereby make better decisions.

In the example decision tree 216 illustrated, models 602-612 represent either query, URL or query-URL pair models, such as from the models library 210 (see FIG. 2). The decision tree 216 may be navigated by operation of rules, such as rules 218 (FIG. 2). In one example, model 602 may be initially selected. However, a rule may indicate that in the event of a first-ever spike for a query, the present model (e.g., model 602) should be replaced, and that the replacement model should be either model 604 or 610, depending on the nature of the spike, the timing of the spike or other factors. A second rule may indicate that model 604 should be replaced under prescribed circumstances, such as transformation of the URL into a celebrity status. Depending on circumstances and aspects of the second rule, model 604 may be replaced with model 606 or model 608.

In one example, decision tree 216 may be configured to grow, develop additional detail, simplify or otherwise change over time. The changes may be considered a learning process, and may be made according to the learning algorithm 214 (FIG. 2). The changes may include the addition of new models when they become available, the removal of outdated and/or discredited models, or the movement of existing models to different locations on the decision tree 216. The changes may also include changes to existing rules, removal of rules, addition of rules, etc. Thus, the decision tree 216 provides one example of how the learning algorithm 214 of the selection module 208 may be configured and used to select from among available models. Accordingly, the decision tree 216 assists in the selection of an appropriate query model, URL model and/or query-URL pair model, as indicated by the circumstances.

Example URL Ranking

Figure 7:
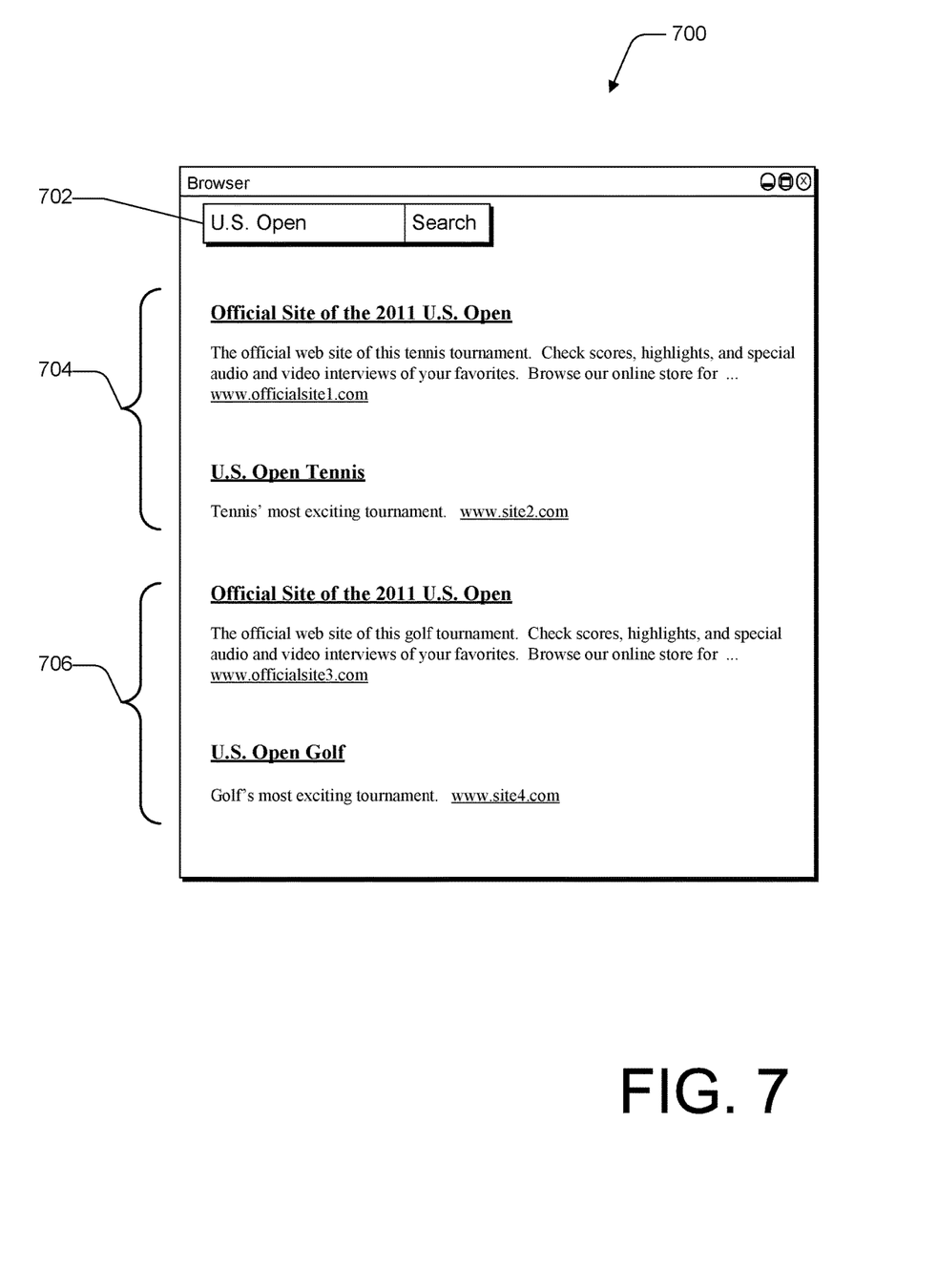
FIG. 7 is a diagram of a browser window showing an example URL listing, the listing made in response to a query. The example URL listing shows output ranked according to user intent, wherein the user intent may have been obtained by operation of a time-aware ranking system.

FIG. 7 shows an example browser window 700 showing an example URL listing in response to a query wherein the output has been ranked according to user intent, the user intent having been obtained by operation of a time-aware ranking system.

In the example of browser window 700, the listing of URLs was made in response to a query 702 posed to a search engine (e.g., search engine 114 of FIG. 1). The example URL listing shows output ranked according to user intent. In particular, a first portion 704 of the URL listing is associated with URLs that have a higher likelihood and/or greater probability density function of being associated with the intent of the user who submitted the query 702. In contrast, a second portion 706 of the URL listing is associated with URLs that have a lower likelihood and/or lesser probability density function of being associated with the intent of the user who submitted the query 702. The likelihood and/or probability density function may have been located within the prediction module 212 (FIG. 2), and may have used one or more of the query model 226, the URL model 228 and/or the query-URL pair model 230. Accordingly, the prediction module 212 may be configured to study the intent of the client/user. The intent may be useful and/or relevant to the inclusion and/or ordering of URLs in the listing, including distinguishing between URLs thought to be more in accord with the user's intent (e.g., the first portion 704) and URLs thought to be less in accord (e.g., the second portion 706).

Example Processes

Figure 8:
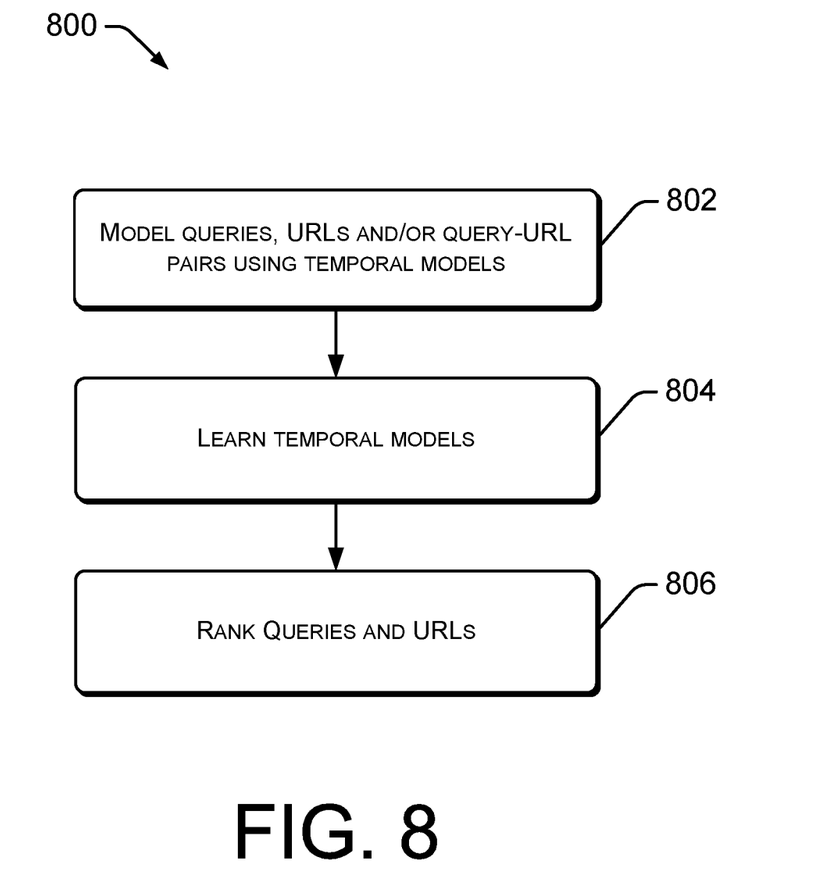
FIGS. 8 and 9 are flow diagrams illustrating example processes involving time-aware ranking.
Figure 9:
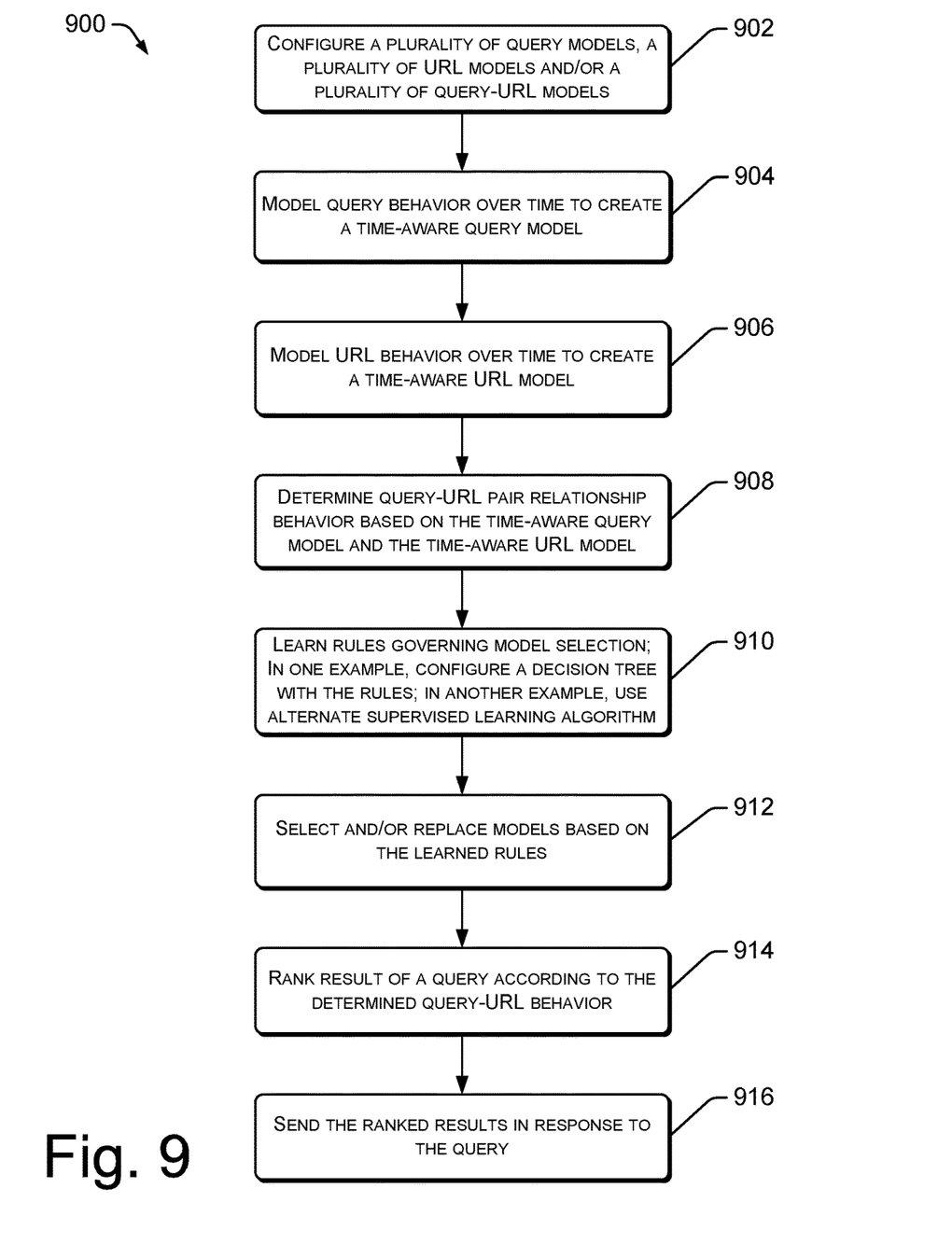

The example processes of FIGS. 8 and 9 are flow diagrams illustrating example processes involving time-aware ranking. FIGS. 8 and 9 can be understood in part by reference to the configurations of FIGS. 1-7. However, FIGS. 8 and 9 contain techniques of general applicability, and are not limited by other drawing figures and/or prior discussion.

Each process described herein is illustrated as a collection of blocks or operations in a logical flow graph, which represent an example sequence of operations that can be implemented in hardware, software, or a combination thereof. The processes may include storing, in a memory communicatively coupled to a processor, computer-executable instructions for performing a method, such as a method of time-aware ranking, and executing the instructions by operation of the processor.

The operations discussed herein may represent computer-executable instructions stored on one or more computer-readable storage media 112, 120, etc., that, when executed by one or more processors 110, 118, etc., perform the recited operations. Such storage media or memory 112, 120, processors 110, 118 and computer-readable instructions can be located within an image retrieval system (e.g., system 100 of FIG. 1) according to a desired design or implementation. The storage media, devices and/or memory 112, 120 seen in FIG. 1 are representative of storage media generally, both removable and non-removable, and of any technology. Thus, the recited operations represent actions, such as those described in FIGS. 8 and 9, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as required and/or a limitation, and any number of the described operations can be combined in any order and/or in parallel to implement the process. The above discussion may apply to other processes described herein.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Any such computer storage media may be part of the system 100. Moreover, the computer-readable media may include computer-executable instructions that, when executed by the processor(s) 108, perform various functions and/or operations described herein.

In contrast, communication media is distinguished from computer storage media. Communication media may embody computer-readable instructions, data structures, program modules, or other data in a modulated data signal, such as a carrier wave, or other transmission mechanism. As defined herein, computer storage media does not include communication media.

FIG. 8 is a flow diagram 800 illustrating example processes involving time-aware ranking. At operation 802, queries, URLs and/or query-URL pairs may be modeled, represented and/or described by temporal or time-aware models. A key component to any temporal system is the ability to model and predict. This approach may be extended to ranking, such as ranking of URLs returned by a search engine. In one example, a learned set of temporal models may be configured to describe behavior of URL clicks (or impressions into a browser) over time. Similarly, a set of temporal models can be learned to describe behavior of query frequency over time, i.e., the receipt by a search engine of queries over time. For every query (e.g., "football"), a model of clicks associated with the query may be created. The model can be configured to model clicks and click-frequency over time using state-space models and/or modeling techniques. Such models may be configured to describe and model trend, seasonality, error, size of window and other factors. Such models may also evaluate parameters based on past aggregated click (e.g., click frequency) data. The same may be done for URL clicks (and impressions or pastes into a browser).

In one example, the queries and URLs may be modeled according to state-space models (SSM), and may be based at least in part on past user behavior. In particular, the queries and/or URLs may be modeled as time series. Given a time series, $Y_1, \ldots, Y_n$, it may be assumed that a process that generated the time series is a sequence of state vectors. Assuming a state space model (SSM), let $X_t$ be a state vector at moment of time t. Then a semi-linear state space model is defined by:

$$Y_t = \omega(\theta) X_{t-1} + \varepsilon, \quad \text{(observation equation); and}$$

$$X_t = F(\theta) X_{t-1} + G(\theta) \varepsilon, \quad \text{(state transition equation).}$$

From the above equations, it can be seen that operation of state space modeling predicts and/or allows generation of:

joint learning of $Y_1, \ldots, Y_n$ along with internal states $x_0, \ldots, x_n$ and residuals $\varepsilon_0 \ldots \varepsilon_n$ (parametric and non-parametric);

"future states" $Y_1, \ldots, Y_n$ along with internal states $x_{n+1} \ldots x_{n+h-1}$ using the state transition equation; and use of the new states produce distribution on "future values" involving the probability density function pdf $(y_{n+1}, \ldots, \text{pdf}(y_{n+h}))$.

At operation 804, temporal models are learned. In one example, several temporal models may be learned for each query, for each URL and for each query-URL pair. In the example of FIG. 2, these models are seen in the models library 210. Thus, a query (e.g., "football"), a URL (e.g., "BlueTeam.com") and a query-URL pair (e.g., the pair of "football" and "BlueTeam.com") may be modeled to predict behavior over time. In some example implementations, use of one of the query models, one of the URL models and/or one of the query-URL pair models is preferable. Accordingly, a mechanism to select models may be used.

In one example of operation 804, a learning mechanism may be used. Such a learning mechanism may evolve to learn which temporal model (e.g., combination of trend, seasonality, error and/or size of window) to use. The decision of which model(s) to select may be based on static and temporal characteristics of the query and the URL that are being modeled. In the example of FIG. 2, the selection module 208 selects from among the models available in the models library 210. In one example, the selection is performed by a learning algorithm 214, which in a further example may be implemented by a decision tree 216 and associated rules 218.

At operation 806, queries and URLs may be ranked. In one example, a process of ranking of URLs advantageously ranks higher those URLs more consistent with a user's intent when providing search query. Thus, in FIG. 7, URLs 704 are more highly ranked than URLs 706 because a model indicated that URLs 704 are more closely associated with intent of the user from whom the query was obtained.

In one example, query-URL behavior may be modeled over time, such as by observing how a certain URL behaves over time for a specific query. This modeling enables the prediction of future interaction (either URL click or impression into a browser) for a URL for the query. Use of this prediction alone enables ordering of the URLs for the query for a specific time. Use of this prediction with other ranking features enables the ranking of the URLs for the query for a specific time with other static content.

FIG. 9 is a flow diagram illustrating an example process 900 by which time-aware ranking can be performed. At operation 902, a plurality of query models, a plurality of URL models and/or a plurality of query-URL models are configured. These models may be configured as time-aware models. Referring to the example of FIG. 2, the models library 210 includes a plurality of query models 220, a plurality of URL models 222 and a plurality of query-URL models 224. Such models may be constructed according to a time series or other technology. FIGS. 3-5 show examples of a query model, a URL model and a query-URL model, respectively, configured as time series. Additionally, block 802 of FIG. 8 and associated discussion include additional examples of how the plurality of models may be configured.

At operation 904, query behavior is modeled over time to create one or more time-aware query models. In the example of FIG. 2, a plurality of time-aware query models 226 is stored in the model library 210. Such models may be created based on time-series technology, as represented by the time series seen in FIG. 3. Such models may be extended, evolved, maintained or upgraded by the library 210, as indicated by changing circumstances. Accordingly, query behavior may be modeled over time in an on-going manner.

Similarly, at operation 906, URL behavior is modeled over time to create a time-aware URL model. In the example of FIG. 2, a plurality of time-aware URL models 228 is stored in the model library 210. Such models may be created based on time-series technology, as represented by the time series seen in FIG. 4. Such models may be extended, evolved, maintained or upgraded by the library 210, as indicated by changing circumstances. Accordingly, URL behavior may be modeled over time in an on-going manner.

At operation 908, a relationship and/or behavior of a query-URL pair may be determined and/or predicted based on the time-aware query model and the time-aware URL model. Alternatively, the query-URL relationship and/or behavior may be determined and/or predicted based on an independently created query-URL model. In the example of FIG. 2, a plurality of query-URL models 224 are seen in the models library 210. In the example of FIG. 5, a time series is used to predict query-URL behavior. Alternative modeling technology may be used to create one or more query-URL models as indicated by circumstances. Accordingly, query-URL behavior may be modeled over time in an on-going manner.

In one example, the behavior of one or more query-URL pairs can be modeled over time by modeling query and URL behavior. Thus, modeling query behavior over time may be performed to create a time-aware query model (e.g., based on a first time series). Similarly, modeling URL behavior over time may be performed to create a time-aware URL model (e.g., based on a second time series). And further, the time-aware query model and the time-aware URL model may be used to model the one or more query-URL pairs.

At operation 910, rules governing model selection are learned. In one example, learned rules may address what to do when a query or URL "spikes." Such a rule may suggest switching to a different model that more accurately handles spikes. In another example, a rule may indicate what to do with a query or URL after an event with which it is associated passes. Such a rule may also suggest switching to a different model that more accurately handles aging information. Accordingly, rule(s) governing model selection may be learned, and the rules may evolve over time. The evolution of the rule(s) may be based on query behavior, URL behavior and/or query-URL pair behavior.

At operation 912, a decision tree is configured with rules and is used to select from among the plurality of query models, the plurality of URL models and/or the plurality of query-URL model pairs. In the example of FIG. 6, a decision tree 216 is configured to allow selection from among a plurality of models, based on circumstances and the application of rules. In the example of FIG. 2, models from the models library 210 are selected for use in the predication module 212.

At operation 914, models are selected and/or replaced based on the learned rules. In the example of FIG. 6, the decision tree 216 is traversed (or a portion of the tree navigated) based on the rules (e.g., rules 218 of FIG. 2). Traversing the decision tree 216 may result in selection of a different node, representing a different model. Accordingly, models may be selected based on the rules. Moreover, learned or changed rules may result in replacement of models, including replacement of time-aware query, URL and query-URL pair models. Moreover, the decision tree or other selection tool may be configured for learning rules governing model selection, wherein the rules change over time based on query behavior over time and URL behavior over time. The selection tool may also be configured for switching between two time-aware query models, switching between two the time-aware URL models and/or switching between two time-aware query-URL models based on operation of the learned rules. And further, the selection tool may be configured for selecting between the plurality of query-URL models based on static and temporal characteristics of the query-URL pair.

At operation 916, results of a query (e.g., a listing of URLs) may be ranked according to the determined and/or predicted query-URL behavior. In the example of FIG. 2, the ranking may be performed by the ranking module 202, such as by operation of the dynamic rank scoring module 204 and the time-aware ranking module 206. In the example of FIG. 7, some URLs are ranked higher, and others ranked lower, based on user intent. In one example, user intent may be inferred from query-URL pair behavior.

At operation 918, the ranked results are sent in response to the query. In the example of FIG. 2, the query 126 is received by operation of the interface 232, and the ranked URL results 234 are transmitted to the client (e.g., client 104 of FIG. 1). The ranked results may be displayed as seen in FIG. 7, wherein some results are displayed above or before other results. In one example, predicted query-URL behavior may indicate, for a particular query, that a future change will elevates a first URL to a popularity level greater than a second URL. In such an example, the ranked results may include the first URL ranked higher than the second URL.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving a query, wherein the query includes a time parameter;
predicting an intent of a user providing the query, wherein the predicting is based at least in part on the time parameter;
in response to the query and the intent of the user, traversing a decision tree of a first URL model and a second URL model, wherein a first rule governs how to traverse the decision tree from the first URL model to the second URL model, wherein the first rule is associated with the time parameter;
based on the traversal to the second URL model, selecting the second URL model; and
providing a URL in response to the query, wherein the URL is associated with the second URL model.
2. The method of claim 1, wherein the first URL model models a first query-URL pair, and wherein the second URL model models a second query-URL pair.
3. The method of claim 1, wherein modeling the first query-URL pair and the second query-URL pair is based on a time series.

4. The method of claim 1, wherein modeling the first query-URL pair and the second query-URL pair comprises:
modeling query behavior over time to the first query model, wherein the first query model is based at least in part on a first time series; and
modeling URL behavior over time to create the second query model based at least in part on a second time series.

5. The method of claim 1, the method further comprises:
ranking two or more URLs associated with the second query model; and
displaying the two or more URLs in a rank list.

6. The method of claim 5, wherein the rank is determined based at least in part on a static characteristic of the query.

7. The method of claim 1, wherein the time parameter is one or more of a time of day, a time of year, a season of year, and/or an elapsed time since a website was launched.

8. The method of claim 1, wherein:
receiving a list of URLs from a search service, wherein the list of URLs has a first ranking determined by the search service; and
based on selecting the second URL model, reordering the second query-URL pair to create a second ranking.

9. A search service comprising:
a memory that stores:
a models library comprising a decision tree of a first URL model and a second URL model, wherein a first rule governs how to traverse the decision tree from the first URL model to the second URL model, wherein the first rule is associated with the time parameter;
a processor, in communication with the memory, wherein the processor executes:
a selection module to:
receive a query, wherein the query includes a time parameter;
predict an intent of a user providing the query, wherein the predicting is based at least in part on the time parameter;
in response to the query and the intent of the user, traverse the decision tree from the first URL model to the second URL model based on the first rule;
based on the traversal to the second URL model, select the second URL model; and
provide a URL in response to the query, wherein the URL is associated with the second URL model.

10. The search service of claim 9, wherein the first URL model models a first query-URL pair, and wherein the second URL model models a second query-URL pair.

11. The search service of claim 10, wherein modeling the first query-URL pair and the second query-URL pair is based on a time series.

12. The search service of claim 10, wherein modeling the first query-URL pair and the second query-URL pair comprises:
modeling query behavior over time to the first query model, wherein the first query model is based at least in part on a first time series; and
modeling URL behavior over time to create the second query model based at least in part on a second time series.

13. The search service of claim 10, the search service further comprises:
ranking two or more URLs associated with the second query model; and
displaying the two or more URLs in a rank list.

14. The search service of claim 13, wherein the rank is determined based at least in part on a static characteristic of the query.

15. The search service of claim 14, wherein the time parameter is one or more of a time of day, a time of year, a season of year, and/or an elapsed time since a website was launched.

16. The search service of claim 15, wherein:
receiving a list of URLs from a search service, wherein the list of URLs has a first ranking determined by the search service; and
based on selecting the second URL model, reordering the second query-URL pair to create a second ranking.

17. A system comprising:
a memory that stores:
a models library comprising a decision tree of a first URL model and a second URL model, wherein a first rule governs how to traverse the decision tree from the first URL model to the second URL model, wherein the first rule is associated with the time parameter;
a processor, in communication with the memory, wherein the processor executes:
a selection module to:
receive a query, wherein the query includes a time parameter;
predict an intent of a user providing the query, wherein the predicting is based at least in part on the time parameter;
in response to the query and the intent of the user, traverse the decision tree from the first URL model to the second URL model based on the first rule;
based on the traversal to the second URL model, select the second URL model; and
provide a URL in response to the query, wherein the URL is associated with the second URL model.

18. The system of claim 17, wherein the first URL model models a first query-URL pair, and wherein the second URL model models a second query-URL pair.

19. The system of claim 18, wherein modeling the first query-URL pair and the second query-URL pair is based on a time series.

20. The system of claim 18, wherein modeling the first query-URL pair and the second query-URL pair comprises:
modeling query behavior over time to the first query model, wherein the first query model is based at least in part on a first time series; and
modeling URL behavior over time to create the second query model based at least in part on a second time series.

21. The system of claim 18, the search service further comprises:
ranking two or more URLs associated with the second query model; and displaying the two or more URLs in a rank list.

* * * * *